United States Patent
Li

(10) Patent No.: US 10,423,322 B2
(45) Date of Patent: Sep. 24, 2019

(54) METHOD FOR VIEWING MESSAGE AND TERMINAL

(71) Applicant: GUANGDONG OPPO MOBILE TELECOMMUNICATIONS CORP., LTD., Dongguan (CN)

(72) Inventor: Jianlin Li, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 93 days.

(21) Appl. No.: 15/648,109

(22) Filed: Jul. 12, 2017

(65) Prior Publication Data

US 2017/0308260 A1    Oct. 26, 2017

Related U.S. Application Data

(63) Continuation-in-part of application No. PCT/CN2016/081711, filed on May 11, 2016.

(30) Foreign Application Priority Data

Aug. 27, 2015 (CN) .......................... 2015 1 0543356

(51) Int. Cl.
    *G06F 3/0488* (2013.01)
    *G06F 3/0481* (2013.01)
    *G06F 3/041* (2006.01)
    *G06F 3/0484* (2013.01)
    *G06K 9/00* (2006.01)

(52) U.S. Cl.
    CPC .......... *G06F 3/0488* (2013.01); *G06F 3/0416* (2013.01); *G06F 3/0481* (2013.01); *G06F 3/04817* (2013.01); *G06K 9/00087* (2013.01); *G06F 3/0414* (2013.01); *G06F 3/04845* (2013.01); *G06F 2203/04105* (2013.01); *G06F 2203/04806* (2013.01)

(58) Field of Classification Search
    CPC .......................................... G06F 3/0414
    USPC ................. 715/763–765, 851, 855
    See application file for complete search history.

(56) References Cited

U.S. PATENT DOCUMENTS

| 2013/0234959 A1* | 9/2013 | Yoo .......................... G06F 9/452 345/173 |
| 2014/0160010 A1* | 6/2014 | Jung ...................... G06F 3/0414 345/156 |
| 2014/0267078 A1 | 9/2014 | Kukulski et al. |
| 2015/0296062 A1 | 10/2015 | Lee |

(Continued)

FOREIGN PATENT DOCUMENTS

| CN | 102270092 A | 12/2011 |
| CN | 102662573 A | 9/2012 |
| CN | 103870190 A | 6/2014 |

(Continued)

*Primary Examiner* — Cao H Nguyen
(74) *Attorney, Agent, or Firm* — Young Basile Hanlon & MacFarlane, P.C.

(57) ABSTRACT

A method for viewing a message is provided. The method may include the follows. A first touch operation performed on an icon of a message application is detected. One or more touch parameters of the first touch operation are obtained, and then one or more first target message are displayed when each of the one or more touch parameters of the first touch operation satisfies a corresponding preset condition. A related terminal is also provided.

20 Claims, 3 Drawing Sheets

(56) References Cited

U.S. PATENT DOCUMENTS

2017/0011210 A1\* 1/2017 Cheong ................ A61B 5/0022

FOREIGN PATENT DOCUMENTS

| CN | 103914148 A | 7/2014 |
| CN | 104346050 A | 2/2015 |
| CN | 104714741 A | 6/2015 |
| CN | 104777957 A | 7/2015 |
| CN | 104823434 A | 8/2015 |
| CN | 105183284 A | 12/2015 |

\* cited by examiner

METHOD FOR VIEWING MESSAGE AND TERMINAL

CROSS REFERENCE TO RELATED APPLICATIONS

This application is a continuation-in-part of PCT Patent Application No. PCT/CN2016/081711, filed on May 11, 2016, which claims priority to Chinese Patent Application No. 201510543356.4, filed on Aug. 27, 2015, contents of all of which are hereby incorporated by reference in their entireties.

TECHNICAL FIELD

The present disclosure relates to the field of electronic technology, and particularly to a method for viewing a message and a terminal.

BACKGROUND

With continuous development and popularity of terminals (for example, mobile phones), terminals have become a necessity in daily life. In daily life, people often use mobile phones to make calls, answer calls, receive and reply to short messages, and so on. In actual use, when a user needs to view a short message, a message application needs to be started to display a message list, and then a certain short message of the short list is clicked for viewing content of the short message. When using the above manner to view a message, interface switching needs to be performed for many times, thus the operation process is complicated and time consuming.

SUMMARY

Embodiments of the present disclosure provide a method for viewing a message and a terminal, which can save time for viewing one or more messages.

According to a first aspect, a method for viewing a message is provided. The method may include the follows. A first touch operation performed on an icon of a message application is detected. At least one touch parameter of the first touch operation is obtained, and then at least one first target message is displayed when each of the at least one touch parameter of the first touch operation satisfies a corresponding preset condition.

According to a second aspect, a related terminal is also provided.

In the present disclosure, one or more first target messages are displayed when each first touch parameter of the first touch operation satisfies the corresponding preset condition. That is, one or more messages can be directly displayed for viewing when the icon of the message application is touched, which saves time of viewing one or more messages.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Persons skilled in the art can derive other accompanying drawings according to the described accompanying drawings without creative efforts.

DETAILED DESCRIPTION OF ILLUSTRATED EMBODIMENTS

The technical solutions of embodiments of the present disclosure will be described clearly and completely in combination with the accompanying drawings of the embodiments of the present disclosure. Obviously, the described embodiments are merely a part of embodiments of the present disclosure, and not all of the embodiments. All other embodiments obtained by those skilled in the art without creative efforts based on the embodiments of the present disclosure shall fall within the protection scope of the present disclosure.

Embodiments of the present disclosure provide a method for viewing a message and a terminal, which can save time for viewing a message.

The method may include the follows. A first touch operation performed on an icon of a message application is detected. At least one touch parameter of the first touch operation is obtained, and then at least one first target message is displayed when each of the at least one touch parameter of the first touch operation satisfies a corresponding preset condition.

Figure 1:
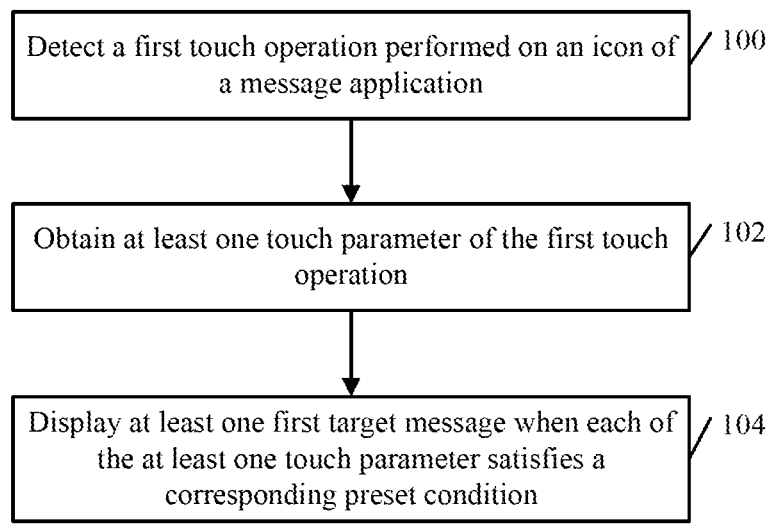
FIG. 1 is a flow chart of a method for viewing a message in accordance with an embodiment of the present disclosure.

FIG. 1 is a flow chart of a method for viewing a message in accordance with an embodiment of the present disclosure. The method may include the follows.

At block 100, a first touch operation performed on an icon of a message application is detected.

In the embodiment, the terminal may be a device having a touch screen or a touch panel arranged thereon, for example, a mobile phone, a tablet computer, a handheld computer, a personal digital assistant (PDA), a smart watch, and so on, and the present disclosure is not limited thereto.

In the embodiment, the first touch operation performed on the icon of the message application may be detected in real time, and also the first touch operation performed on the icon of the message application may be detected every a preset interval. The message application may be a system-default message application of the terminal, and also may be a third-party message application installed in the terminal. When the message application is started, a message list recording one or more messages is displayed. The messages may be text messages, image messages, and so on.

In the embodiment, the first touch operation may be an operation of pressing the icon of the message application of the terminal, and may be detected based on a change of a capacitance value or resistance value of the touch screen or touch panel.

At block 102, at least one touch parameter of the first touch operation is obtained.

In the embodiment, the at least one touch parameter may include a first touch pressure value. The first touch pressure value may be obtained via one or more pressure sensors of the terminal. When more pressure sensors are included, the pressure sensors may be uniformly distributed in a certain region of the terminal or may be uniformly distributed in the terminal.

In at least one alternative embodiment, besides the first touch pressure value, the at least one touch parameter may further include at least one of the following: a first touch duration, a first fingerprint information, a first touch position information, a first touch direction, and a first touch trace, and the present disclosure is not limited thereto. Certainly, in other embodiments, the first touch pressure value may not be obtained, and the at least one touch parameter may include at least one of the following: the first touch duration, the first fingerprint information, the first touch position information, the first touch direction, and the first touch trace.

The first touch position, the first touch direction, and the first touch trace may be determined based on a change of touched coordinate points. The first fingerprint information may be obtained via a fingerprint sensor of the terminal. Certainly, touched positions of the touch screen or touch panel, a movement of a finger on the touch screen or touch panel and so on may be determined via one or more photographing devices, or via one or more infrared sensors, or via one or more temperature sensors, and the present disclosure is not limited thereto.

At block 104, at least one first target message is displayed when each of the at least one touch parameter satisfies a corresponding preset condition.

In the embodiment, the at least one touch parameter may include the first pressure value. The corresponding preset condition may be that the first touch pressure value is greater than a first preset pressure value. That is, when the first touch pressure value is greater than the first preset pressure value, one or more first target messages are displayed. The first preset pressure value may be a system-default value, and cannot be modified by a user. The first preset pressure value may also be a user-defined value, and can be modified according to user actual needs.

In at least one alternative embodiment, the at least one touch parameter may include the first touch pressure value and the first touch duration. The corresponding preset condition may be that the first touch pressure value is greater than the preset pressure value and the first touch duration is greater than a preset duration. That is, when the first touch pressure value is greater than the preset pressure value and the first touch duration is greater than the preset duration, one or more first target messages may be displayed. The preset duration may be a system-default value, and also may be a user-defined value. For example, the preset duration may be two seconds, three seconds, and so on. By means of further using the first touch duration, misoperations may be prevented.

In at least one alternative embodiment, the at least one touch parameter may include the first touch pressure value and the first fingerprint information. The corresponding preset condition may be that the first touch pressure value is greater than the preset pressure value and the first fingerprint information matches with preset fingerprint information. That is, when the first touch pressure value is greater than the preset pressure value and the first fingerprint information matches with preset fingerprint information, one or more first target messages are displayed. When a matching degree between the first fingerprint information and the preset fingerprint information is greater than or equal to a preset threshold, it is determined that the first fingerprint information matches with the preset fingerprint information. By means of verifying the first fingerprint information, illegal message viewing may be prevented.

In at least one alternative embodiment, the at least one touch parameter may include the first touch pressure value, the first touch duration, and the first fingerprint information. The corresponding preset condition may be that the first touch pressure value is greater than the first preset pressure value, the first touch duration is greater than the preset duration, and the first fingerprint information matches with the preset fingerprint information. That is, when the first touch pressure value is greater than the first preset pressure value, the first touch duration is greater than the preset duration, and the first fingerprint information matches with the preset fingerprint information, one or more first target messages are displayed.

In at least one alternative embodiment, one or more message previewing windows may be output to display the one or more first target messages. One message previewing window may be used to display one first target message, and one message previewing window may also be used to display two or more first target messages. When more message previewing windows are displayed, the message previewing windows may be displayed in a preset display mode. For example, when two message previewing windows are displayed, one may be displayed on the top of the screen of the terminal, and the other may be displayed on the bottom of the screen of the terminal, or one may be displayed in a greater size, and the other may be displayed in a smaller size. When more messages are displayed in one message previewing window, the messages may be displayed in a preset display mode. For example, when two messages are displayed in one message previewing window, one message may be displayed on the top of the message previewing window, and the other may be displayed on the bottom of the message previewing window.

In at least one alternative embodiment, two or more first target messages may be displayed. The first target messages may be messages from a designated contact person, for example, a family member, and also may be messages received within a designated period, for example, from 8:00 am to 12:00 am, and the present disclosure is not limited thereto.

In at least one alternative embodiment, one first target message may be displayed. The first target message may be a message the time of receiving which is most adjacent to the current system time (for example, the message displayed on the top of the message list, also may be a designated message (for example, a weather forecast message), and also may be a message the time of receiving which is most away from the current system time (for example, the message displayed on the bottom of the message list), and the present disclosure is not limited thereto.

In at least one alternative embodiment, when one first target message is displayed, after the finger leaves the touch panel or the touch screen, the message previewing window for displaying the first target message may be displayed in a full-screen mode.

For the method illustrated in FIG. 1, one or more first target messages are displayed when each first touch parameter of the first touch operation satisfies the corresponding preset condition. That is, one or more messages can be directly displayed for viewing when the icon of the message application is touched, which saves time of viewing one or more messages.

In at least one alternative embodiment, the method may further include the follows. A second touch operation is detected after displaying the one or more first target messages, and at least one touch parameter of the second touch operation is obtained. At least one second target message corresponding to the second touch operation is determined based on a corresponding relationship between the at least one touch parameter of the second touch operation and at least one second target message, and then the terminal switches to display the at least one second target message corresponding to the second touch operation. That is, one or more second target messages are displayed. Therefore, switching the display of different messages is convenient and time-saving.

In at least one alternative embodiment, when a duration of a touch operation performed on the icon of the message application is greater than a preset duration, it is determined that the first touch operation is performed, and one or more first target messages are displayed. If the user continues to touch the icon of the message application without leaving the icon of the message application after the one or more first target messages are displayed, it is determined that the second touch operation is performed, and one or more second target messages are displayed. In other embodiments, after one or more first target messages are displayed, the finger of the user leaves the touch screen or the touch panel, and then the user touches the icon of the message application or the message previewing window to perform the second touch operation.

In the embodiment, the at least one touch parameter of the second touch operation may include a second touch pressure value. The corresponding relationship between the at least one touch parameter of the second touch operation and at least one second target message may be preset in advance. That is, when the second touch pressure value is obtained, the corresponding relationship is queried to determine one or more second target messages corresponding to the second pressure value, i.e. corresponding to the second touch operation. Different second pressure values may correspond to the same second target message, or may correspond to different second target messages.

In at least one alternative embodiment, besides the second touch pressure value, the at least one touch parameter of the second touch operation may further include at least one of the following: a second touch duration, a second fingerprint information, a second touch position information, a second touch direction, and a second touch trace. Certainly, in other embodiments, the second touch pressure value may not be obtained, and the at least one touch parameter of the second touch operation may include at least one of the following: the second touch duration, the second fingerprint information, the second touch position information, the second touch direction, and the second touch trace.

In at least one alternative embodiment, the method may further include the follows. A third touch operation is detected after displaying the first target message, and at least one touch parameter of the third touch operation is obtained. A display mode corresponding to the third touch operation is determined based on a corresponding relationship between the at least one touch parameter of the third touch operation and at least one display mode each for displaying at least one message, and then the at least one first target message is displayed in the determined display mode.

In at least one alternative embodiment, when a duration of a touch operation performed on the icon of the message application is greater than a preset duration, it is determined that the first touch operation is performed, and one or more first target messages are displayed. If the user continues to touch the icon of the message application without leaving the icon of the message application after the one or more first target messages are displayed, it is determined that the third touch operation is performed, a display mode for displaying the one or more first target messages is determined, and then the one or more first target messages are displayed in the determined display mode. In other embodiments, after one or more first target messages are displayed, the finger of the user leaves the touch screen or the touch panel, and then the user touches the icon of the message application or the message previewing window to perform the third touch operation.

In the embodiment, the at least one touch parameter of the third touch operation may include a third touch pressure value. The corresponding relationship between the at least one touch parameter of the third touch operation and at least one display mode each for displaying at least one message may be preset in advance. That is, when the third touch pressure value is obtained, the corresponding relationship is queried to determine a display mode corresponding to the third touch pressure value, i.e. corresponding to the third touch operation.

The determined display mode may include a scaling factor of the one or more message previewing windows, and a scaling factor of content of the one or more first target messages. That is, when the message previewing window is zoomed in or zoomed out, the content displayed in the message previewing window is accordingly zoomed in or zoomed out, so that it is convenient and comfortable for the user to read the content.

In at least one alternative embodiment, besides the third touch pressure value, the at least one touch parameter of the third touch operation may further include at least one of the following: a third touch duration, a third fingerprint information, a third touch position information, a third touch direction, and a third touch trace. Certainly, in other embodiments, the third touch pressure value may not be obtained, and the at least one touch parameter of the third touch operation may include at least one of the following: the third touch duration, the third fingerprint information, the third touch position information, the third touch direction, and the third touch trace.

In at least one alternative embodiment, according to one or more touch parameters of a touch operation, deleting a message, editing a message, forwarding a message, and so on may also be executed, and the present disclosure is not limited thereto.

Figure 2:
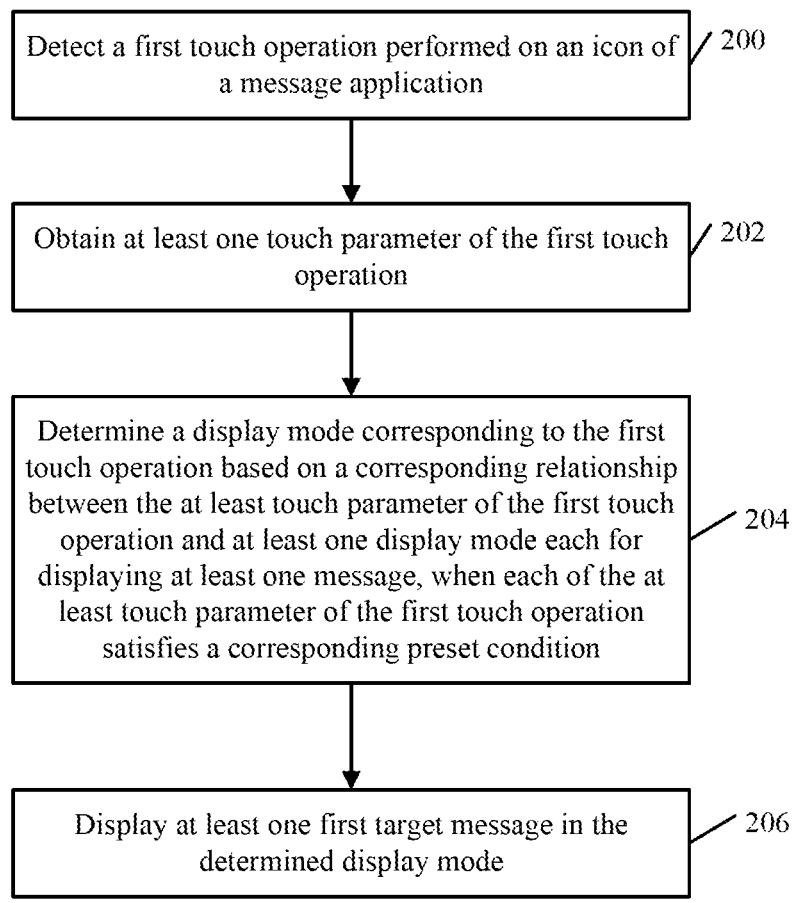
FIG. 2 is a flow chart of a method for viewing a message in accordance with another embodiment of the present disclosure.

FIG. 2 is a flow chart of a method for viewing a message in accordance with another embodiment of the present disclosure. The method may include the follows.

At block 200, a first touch operation performed on an icon of a message application is detected. The operation at block 200 may correspond to the operation at block 100.

At block 202, at least one touch parameter of the first touch operation is obtained. The operation at block 202 may correspond to the operation at block 102.

At block 204, a display mode corresponding to the first touch operation is determined based on a corresponding relationship between the at least touch parameter of the first touch operation and at least one display mode each for displaying at least one message, when each of the at least touch parameter of the first touch operation satisfies a corresponding preset condition.

At block 206, at least one first target message is displayed in the determined display mode.

In at least one alternative embodiment, illustrations of the corresponding preset condition may be substantially the same as that illustrated in FIG. 1, which will not be repeated herein.

In at least one alternative embodiment, one or more message previewing windows may be output to display the one or more first target messages. One message previewing window may be used to display one first target message, and one message previewing window may also be used to display two or more first target messages.

In at least one alternative embodiment, two or more first target messages may be displayed. The first target messages may be messages from a designated contact person, for example, a family member, and also may be messages received within a designated period, for example, from 8:00 am to 12:00 am, and the present disclosure is not limited thereto.

In at least one alternative embodiment, one first target message may be displayed. The first target message may be a message the time of receiving which is most adjacent to the current system time (for example, the message displayed on the top of the message list, also may be a designated message (for example, a weather forecast message), and also may be a message the time of receiving which is most away from the current system time (for example, the message displayed on the bottom of the message list), and the present disclosure is not limited thereto.

In at least one alternative embodiment, the corresponding relationship between the at least one touch parameter of the first touch operation and at least one display mode each for displaying at least one message may be preset in advance. The determined display mode may include a scaling factor of each message previewing window, and a scaling factor of content of each first target message. When more message previewing windows are output, the determined display mode may also include an arrangement manner of the message previewing windows. For example, when two message previewing windows are displayed, one may be displayed on the top of the screen of the terminal, and the other may be displayed on the bottom of the screen of the terminal, or one may be displayed in a greater size, and the other may be displayed in a smaller size. When two or more first target messages are displayed in one message previewing window, the determined display mode may include an arrangement manner of the first target messages in one message previewing window. For example, when two first target messages are displayed in one message previewing window, one may be displayed on the top of the message previewing window, and the other may be displayed on the bottom of the message previewing window.

For the method illustrated in FIG. 2, when each touch parameter of the first touch operation satisfies its corresponding preset condition, a display mode for displaying at least one message is determined, and then one or more first target messages are displayed in the determined display mode. Therefore, it is convenient for a user to view one or more messages in a suitable manner by performing a touch operation on the icon of the message application.

Figure 3:
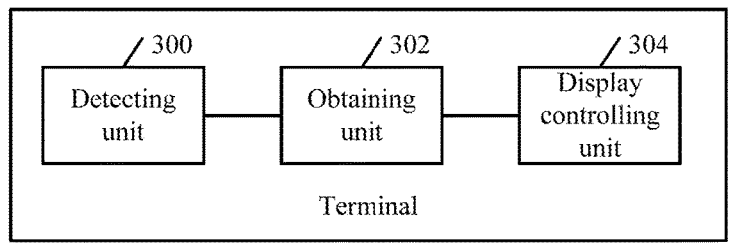
FIG. 3 is a structure diagram of a terminal in accordance with an embodiment of the present disclosure.

FIG. 3 is a structure diagram of a terminal in accordance with an embodiment of the present disclosure. The terminal illustrated in FIG. 3 may include a detecting unit 300, an obtaining unit 302, and a display controlling unit 304.

The detecting unit 300 may be configured to detect a first touch operation performed on an icon of a message application.

In the embodiment, the terminal may be a device having a touch screen or a touch panel arranged thereon, for example, a mobile phone, a tablet computer, a handheld computer, a personal digital assistant (PDA), a smart watch, and so on, and the present disclosure is not limited thereto.

In the embodiment, the first touch operation performed on the icon of the message application may be detected in real time, and also the first touch operation performed on the icon of the message application may be detected every a preset interval. The message application may be a system-default message application of the terminal, and also may be a third-party message application installed in the terminal. When the message application is started, a message list recording one or more messages is displayed. The messages may be text messages, image messages, and so on.

In the embodiment, the first touch operation may be an operation of pressing the icon of the message application of the terminal, and may be detected based on a change of a capacitance value or resistance value of the touch screen or touch panel.

The obtaining unit 302 may be configured to obtain at least one touch parameter of the first touch operation.

In the embodiment, the at least one touch parameter may include a first touch pressure value. The first touch pressure value may be obtained via one or more pressure sensors of the terminal. When more pressure sensors are included, the pressure sensors may be uniformly distributed in a certain region of the terminal or may be uniformly distributed in the terminal.

In at least one alternative embodiment, besides the first touch pressure value, the at least one touch parameter may further include at least one of the following: a first touch duration, a first fingerprint information, a first touch position information, a first touch direction, and a first touch trace, and the present disclosure is not limited thereto. Certainly, in other embodiments, the first touch pressure value may not be obtained, and the at least one touch parameter may include at least one of the following: the first touch duration, the first fingerprint information, the first touch position information, the first touch direction, and the first touch trace.

The first touch position, the first touch direction, and the first touch trace may be determined based on a change of touched coordinate points. The first fingerprint information may be obtained via a fingerprint sensor of the terminal. Certainly, touched positions of the touch screen or touch panel, a movement of a finger on the touch screen or touch panel and so on may be determined via one or more photographing devices, or via one or more infrared sensors, or via one or more temperature sensors, and the present disclosure is not limited thereto.

The display controlling unit 304 may be configured to display at least one first target message when each of the at least one touch parameter satisfies a corresponding preset condition.

In the embodiment, the at least one touch parameter may include the first pressure value. The corresponding preset condition may be that the first touch pressure value is greater than a first preset pressure value. That is, when the first touch pressure value is greater than the first preset pressure value, one or more first target messages are displayed. The first preset pressure value may be a system-default value, and cannot be modified by a user. The first preset pressure value may also be a user-defined value, and can be modified according to user actual needs.

In at least one alternative embodiment, the at least one touch parameter may include the first touch pressure value and the first touch duration. The corresponding preset condition may be that the first touch pressure value is greater than the preset pressure value and the first touch duration is greater than a preset duration. That is, when the first touch pressure value is greater than the preset pressure value and the first touch duration is greater than the preset duration, one or more first target messages may be displayed. The preset duration may be a system-default value, and also may be a user-defined value. For example, the preset duration may be two seconds, three seconds, and so on. By means of further using the first touch duration, misoperations may be prevented.

In at least one alternative embodiment, the at least one touch parameter may include the first touch pressure value and the first fingerprint information. The corresponding preset condition may be that the first touch pressure value is greater than the preset pressure value and the first fingerprint information matches with preset fingerprint information. That is, when the first touch pressure value is greater than the preset pressure value and the first fingerprint information matches with preset fingerprint information, one or more first target messages are displayed. When a matching degree between the first fingerprint information and the preset fingerprint information is greater than or equal to a preset threshold, it is determined that the first fingerprint information matches with the preset fingerprint information. By means of verifying the first fingerprint information, illegal message viewing may be prevented.

In at least one alternative embodiment, the at least one touch parameter may include the first touch pressure value, the first touch duration, and the first fingerprint information. The corresponding preset condition may be that the first touch pressure value is greater than the first preset pressure value, the first touch duration is greater than the preset duration, and the first fingerprint information matches with the preset fingerprint information. That is, when the first touch pressure value is greater than the first preset pressure value, the first touch duration is greater than the preset duration, and the first fingerprint information matches with the preset fingerprint information, one or more first target messages are displayed.

In at least one alternative embodiment, one or more message previewing windows may be output to display the one or more first target messages. One message previewing window may be used to display one first target message, and one message previewing window may also be used to display two or more first target messages. When more message previewing windows are displayed, the message previewing windows may be displayed in a preset display mode. For example, when two message previewing windows are displayed, one may be displayed on the top of the screen of the terminal, and the other may be displayed on the bottom of the screen of the terminal, or one may be displayed in a greater size, and the other may be displayed in a smaller size. When more messages are displayed in one message previewing window, the messages may be displayed in a preset display mode. For example, when two messages are displayed in one message previewing window, one message may be displayed on the top of the message previewing window, and the other may be displayed on the bottom of the message previewing window.

In at least one alternative embodiment, two or more first target messages may be displayed. The first target messages may be messages from a designated contact person, for example, a family member, and also may be messages received within a designated period, for example, from 8:00 am to 12:00 am, and the present disclosure is not limited thereto.

In at least one alternative embodiment, one first target message may be displayed. The first target message may be a message the time of receiving which is most adjacent to the current system time (for example, the message displayed on the top of the message list, also may be a designated message (for example, a weather forecast message), and also may be a message the time of receiving which is most away from the current system time (for example, the message displayed on the bottom of the message list), and the present disclosure is not limited thereto.

In at least one alternative embodiment, when one first target message is displayed, after the finger leaves the touch panel or the touch screen, the message previewing window for displaying the first target message may be displayed in a full-screen mode.

For the terminal illustrated in FIG. 3, one or more first target messages are displayed when each first touch parameter of the first touch operation satisfies the corresponding preset condition. That is, one or more messages can be directly displayed for viewing when the icon of the message application is touched, which saves time of viewing one or more messages.

In at least one alternative embodiment, the detecting unit 300 may be further configured to detect a second touch operation after displaying the one or more first target messages. The obtaining unit 302 may be further configured to obtain at least one touch parameter of the second touch operation. The display controlling unit 304 may be further configured to determine at least one second target message corresponding to the second touch operation based on a corresponding relationship between the at least one touch parameter of the second touch operation and at least one second target message, and switch to display the at least one second target message corresponding to the second touch operation. That is, one or more second target messages are displayed. Therefore, switching the display of different messages is convenient and time-saving.

In at least one alternative embodiment, when a duration of a touch operation performed on the icon of the message application is greater than a preset duration, it is determined that the first touch operation is performed, and one or more first target messages are displayed. If the user continues to touch the icon of the message application without leaving the icon of the message application after the one or more first target messages are displayed, it is determined that the second touch operation is performed, and one or more second target messages are displayed. In other embodiments, after one or more first target messages are displayed, the finger of the user leaves the touch screen or the touch panel, and then the user touches the icon of the message application or the message previewing window to perform the second touch operation.

In the embodiment, the at least one touch parameter of the second touch operation may include a second touch pressure value. The corresponding relationship between the at least one touch parameter of the second touch operation and at least one second target message may be preset in advance. That is, when the second touch pressure value is obtained, the corresponding relationship is queried to determine one or more second target messages corresponding to the second pressure value, i.e. corresponding to the second touch operation. Different second pressure values may correspond to the same second target message, or may correspond to different second target messages.

In at least one alternative embodiment, besides the second touch pressure value, the at least one touch parameter of the second touch operation may further include at least one of the following: a second touch duration, a second fingerprint information, a second touch position information, a second touch direction, and a second touch trace. Certainly, in other embodiments, the second touch pressure value may not be obtained, and the at least one touch parameter of the second touch operation may include at least one of the following: the second touch duration, the second fingerprint information, the second touch position information, the second touch direction, and the second touch trace.

In at least one alternative embodiment, the detecting unit 300 may be further configured to detect a third touch operation after displaying the first target message. The obtaining unit 302 may be further configured to obtain at least one touch parameter of the third touch operation. The display controlling unit 304 may be further configured to determine a display mode corresponding to the third touch operation based on a corresponding relationship between the at least one touch parameter of the third touch operation and at least one display mode each for displaying at least one message, and display the at least one first target message in the determined display mode.

In at least one alternative embodiment, when a duration of a touch operation performed on the icon of the message application is greater than a preset duration, it is determined that the first touch operation is performed, and one or more first target messages are displayed. If the user continues to touch the icon of the message application without leaving the icon of the message application after the one or more first target messages are displayed, it is determined that the third touch operation is performed, a display mode for displaying the one or more first target messages is determined, and then the one or more first target messages are displayed in the display mode. In other embodiments, after one or more first target messages are displayed, the finger of the user leaves the touch screen or the touch panel, and then the user touches the icon of the message application or the message previewing window to perform the third touch operation.

In the embodiment, the at least one touch parameter of the third touch operation may include a third touch pressure value. The corresponding relationship between the at least one touch parameter of the third touch operation and at least one display mode each for displaying a message may be preset in advance. That is, when the third touch pressure value is obtained, the corresponding relationship is queried to determine a display mode corresponding to the third touch pressure value, i.e. corresponding to the third touch operation.

The determined display mode may include a scaling factor of the one or more message previewing windows, and a scaling factor of content of the one or more first target messages. That is, when the message previewing window is zoomed in or zoomed out, the content displayed in the message previewing window is accordingly zoomed in or zoomed out, so that it is convenient and comfortable for the user to read the content.

In at least one alternative embodiment, besides the third touch pressure value, the at least one touch parameter of the third touch operation may further include at least one of the following: a third touch duration, a third fingerprint information, a third touch position information, a third touch direction, and a third touch trace. Certainly, in other embodiments, the third touch pressure value may not be obtained, and the at least one touch parameter of the third touch operation may include at least one of the following: the third touch duration, the third fingerprint information, the third touch position information, the third touch direction, and the third touch trace.

In at least one alternative embodiment, according to one or more touch parameters of a touch operation, deleting a message, editing a message, forwarding a message, and so on may also be executed, and the present disclosure is not limited thereto.

Figure 4:
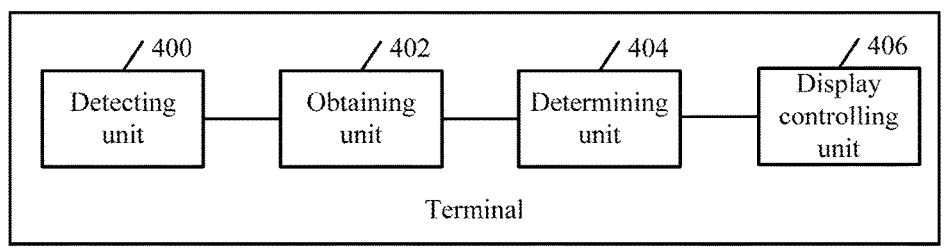
FIG. 4 is a structure diagram of a terminal in accordance with another embodiment of the present disclosure.

FIG. 4 is a structure diagram of a terminal in accordance with another embodiment of the present disclosure. The terminal illustrated in FIG. 4 may include a detecting unit 400, an obtaining unit 402, a determining unit 404, and a display controlling unit 406.

The detecting unit 400 may be substantially the same as the detecting unit 300, and may be configured to detect a touch operation performed on an icon of a message application.

The obtaining unit 402 may be substantially the same as the obtaining unit 302, and may be configured to obtain at least one touch parameter of the touch operation.

The determining unit 404 may be configured to determine a display mode corresponding to the touch operation based on a corresponding relationship between the at least touch parameter of the touch operation and at least one display mode each for displaying at least one message, when each of the at least touch parameter of the first touch operation satisfies a corresponding preset condition.

The display controlling unit 406 may be configured to display at least one target message in the determined display mode.

In at least one alternative embodiment, illustrations of the corresponding preset condition may be substantially the same as that illustrated in FIG. 3, which will not be repeated herein.

In at least one alternative embodiment, one or more message previewing windows may be output to display the one or more target messages. One message previewing window may be used to display one target message, and one message previewing window may also be used to display two or more target messages.

In at least one alternative embodiment, two or more target messages may be displayed. The target messages may be messages from a designated contact person, for example, a family member, and also may be messages received within a designated period, for example, from 8:00 am to 12:00 am, and the present disclosure is not limited thereto.

In at least one alternative embodiment, one target message may be displayed. The target message may be a message the time of receiving which is most adjacent to the current system time (for example, the message displayed on the top of the message list, also may be a designated message (for example, a weather forecast message), and also may be a message the time of receiving which is most away from the current system time (for example, the message displayed on the bottom of the message list), and the present disclosure is not limited thereto.

In at least one alternative embodiment, the corresponding relationship between the at least one touch parameter of the touch operation and at least one display mode each for displaying at least one message may be preset in advance. The determined display mode may include a scaling factor of each message previewing window, and a scaling factor of content of each target message. When more message previewing windows are output, the determined display mode may also include an arrangement manner of the message previewing windows. For example, when two message previewing windows are displayed, one may be displayed on the top of the screen of the terminal, and the other may be displayed on the bottom of the screen of the terminal, or one may be displayed in a greater size, and the other may be displayed in a smaller size. When two or more messages are displayed in one message previewing window, the determined display mode may include an arrangement manner of the target messages in one message previewing window. For example, when two messages are displayed in one message previewing window, one may be displayed on the top of the message previewing window, and the other may be displayed on the bottom of the message previewing window.

For the terminal illustrated in FIG. 4, when each touch parameter of the first touch operation satisfies its corresponding preset condition, a display mode for displaying at least one message is determined, and then one or more target messages are displayed in the determined display mode. Therefore, it is convenient for a user to view one or more messages in a suitable manner by performing a touch operation on the icon of the message application.

It shall be noted that the terminal described in the device embodiment of the present disclosure is illustrated in the form of functional units. The term "unit" used herein shall be taken in the broadest possible sense. Objects for realizing the function of each unit can be an application specific integrated circuit (ASIC), a single circuit, a processor (shared, specific, or chipset) for executing one or more software or hardware procedures, a memory, a combined logic circuit, and/or other appropriate assembly for realizing the above function.

Figure 5:
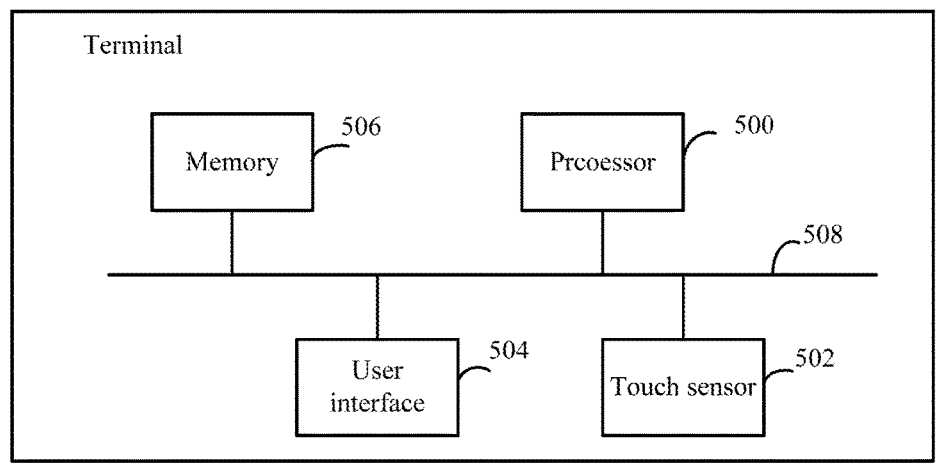
FIG. 5 is a structure diagram of a terminal in accordance with yet another embodiment of the present disclosure.

FIG. 5 is a structure diagram of a terminal in accordance with an embodiment of the present disclosure, and the terminal is configured to execute the method for viewing a message. As illustrated in FIG. 5, the terminal may include at least one processor 500, at least one touch sensor 502, at least one user interface 504, a memory 506 and other components. These components are coupled and communicate with each other via one or more buses 508. A person skilled in the art shall understand that the structure of the terminal illustrated in FIG. 5 is not limit the embodiment of the present disclosure. The structure can be a bus structure, can also be a star structure, and can include more or less components, or some components can be combined, or components can be arranged in a different way.

The processor 500 is a control center of the terminal, and is coupled to various components of the terminal via various interfaces and lines. The processor 500 runs or executes program codes and/or modules of the memory 506 and invokes data of the memory 506 to execute various functions and data processing of the terminal. The processor 500 may be formed by an integrated circuit (IC), for example, may be formed by a single packaged IC, and also may be formed by coupling multiple ICs having the same function or different functions. For example, the processor 500 may only include a central processing unit (CPU), and also may be a combination of the CPU, a digital signal processor (DSP), a graphic processing unit (GPU), and various control chips. In the embodiment of the present disclosure, the CPU may be a single computing core, and can also include a multiple computing core.

The at least one touch sensor 502 may include but is not limited to a pressure sensor, a photographing device, a fingerprint sensor, an infrared sensor, a temperature sensor, and so on, and may be configured to collect one or more touch parameters of a touch operation performed on an icon of a message application.

The at least one user interface 504 may include a touch screen and/or a touch panel for operating the terminal via touch operations.

The memory 506 may store soft programs and modules. The processor 500 invokes the soft programs and modules stored in the memory 506 to execute various functions and data processing of the terminal. The memory 506 may include a program storing region and a data storing region. The program storing region may store an operating system, computer-readable program codes for at least one function, and so on. The data storing region may store data created according to use of the user terminal. In the embodiment, the operating system may be an Android system, an iOS system, a Windows system, or other.

The processor 500 may be configured to invoke the computer-executable program codes to perform following operations: detecting a first touch operation performed on an icon of a message application; obtaining at least one touch parameter of the first touch operation; and displaying at least one first target message when each of the at least one touch parameter of the first touch operation satisfies a corresponding preset condition.

In the embodiment, one or more first target messages are displayed when each first touch parameter of the first touch operation satisfies the corresponding preset condition. That is, one or more messages can be directly displayed for viewing when the icon of the message application is touched, which saves time of viewing one or more messages.

In at least one alternative embodiment, the at least one touch parameter of the first touch operation may include a touch pressure value, and the corresponding preset condition may include that the touch pressure value is greater than a preset pressure value.

In at least one alternative embodiment, the at least one touch parameter of the first touch operation may include a touch pressure value, and a touch duration, and the corresponding preset condition may include that the touch pressure value is greater than the preset pressure value and the touch duration is greater than a preset duration.

In at least one alternative embodiment, the at least one touch parameter of the first touch operation may include a touch pressure value, and a fingerprint information, and the corresponding preset condition may include that the touch pressure value is greater than the preset pressure value and the fingerprint information matches with a preset fingerprint information.

In at least one alternative embodiment, the at least one touch parameter of the first touch operation may include a touch pressure value, a touch duration, and a fingerprint information, and the corresponding preset condition may include that the touch pressure value is greater than the preset pressure value, the touch duration is greater than the preset duration, and the fingerprint information matches with the preset fingerprint information.

In at least one alternative embodiment, the processor 500 may be further configured to invoke the computer-executable program codes to perform following operations: detecting a second touch operation after displaying the at least one first target message; obtaining at least one touch parameter of the second touch operation; determining, based on a corresponding relationship between the at least one touch parameter of the second touch operation and at least one second target message, at least one second target message corresponding to the second touch operation; and switching to display the at least one second target message corresponding to the second touch operation.

In at least one alternative embodiment, the processor 500 may be further configured to invoke the computer-executable program codes to perform following operations: detecting a third touch operation after displaying the at least one first target message; obtaining at least one touch parameter of the third touch operation; determining, based on a corresponding relationship between the at least one touch parameter of the third touch operation and at least one display mode each for displaying at least one message, a display mode corresponding to the third touch operation; and displaying the at least one first target message in the determined display mode.

In one or more other embodiments, the processor 500 may be configured to invoke the computer-executable program codes to perform following operations: detecting a touch operation performed on an icon of the message application; obtaining at least one touch parameter of the touch operation; determining, based on a corresponding relationship between the at least touch parameter of the touch operation and at least one display mode each for displaying at least one message, a display mode corresponding to the touch operation, when each of the at least touch parameter of the touch operation satisfies a corresponding preset condition; and displaying at least one target message in the determined display mode.

At least one message previewing window may be outputted to display the at least one target message. The determined display mode may include a scaling factor of each of the at least one message previewing window, and a scaling factor of content of each of the at least one target message, and may include an arrangement manner of the at least one message previewing window, and also may include an arrangement manner of the at least one target message in the at least one message previewing window.

In the one or more other embodiments, when each touch parameter of the first touch operation satisfies its corresponding preset condition, a display mode for displaying at least one message is determined, and then one or more first target messages are displayed in the determined display mode. Therefore, it is convenient for a user to view one or more messages in a suitable manner by performing a touch operation on the icon of the message application.

According to actual needs, sequences of operations in the method embodiments of the present disclosure may be adjusted, some operations may be combined, and some operations may be deleted.

According to actual needs, some units of the terminal of the present disclosure may be combined, divided, or deleted.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random-access memory (RAM), Disk or CD, and so on.

The foregoing has described in detail a method for viewing a message and a terminal disclosed in the embodiments of the present disclosure. The principles and implementation of the present disclosure are described herein through specific examples. The description about the embodiments of the present disclosure is merely provided to help to understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limitation of the present disclosure.

What is claimed is:

1. A method for viewing a message, comprising:
    determining that a first touch operation is performed on an icon of a message application when a duration of a touch input performed on the icon of the message application exceeds a preset duration;
    obtaining at least one touch parameter of the first touch operation;
    displaying at least one first target message when each of the at least one touch parameter of the first touch operation satisfies a corresponding preset condition;
    determining whether the duration of the touch input performed on the icon of the message application is increased after displaying the at least one first target message;
    determining that a second touch operation is performed on the icon of the message application based on a determination that the duration of the touch input performed on the icon of the message application is increased; and
    switching to display at least one second target message.

2. The method of claim 1, wherein the at least one touch parameter of the first touch operation comprises a touch pressure value, and the corresponding preset condition comprises that the touch pressure value is greater than a preset pressure value.

3. The method of claim 1, wherein the at least one touch parameter of the first touch operation comprises a touch pressure value, and a fingerprint information, and the corresponding preset condition comprises that the touch pressure value is greater than a preset pressure value and the fingerprint information matches with a preset fingerprint information.

4. The method of claim 1, further comprising:
    determining whether a third touch operation is performed on the icon of the message application when the duration of the touch input fails to be increased after displaying the at least one first target message;
    obtaining at least one touch parameter of the third touch operation in response to determining that the third touch operation is performed;
    determining a display mode according to the at least one touch parameter of the third touch operation and a correspondence between touch parameters and display modes; and
    displaying the at least one first target message in the determined display mode.

5. A terminal, comprising:
    a memory configured to store computer-executable program codes; and
    a processor configured to invoke the computer-executable program codes to perform following operations:
        determining that a first touch operation is performed on an icon of a message application when a duration of a touch input performed on the icon of the message application exceeds a preset duration;
        obtaining at least one touch parameter of the first touch operation;
        displaying at least one first target message when each of the at least one touch parameter of the first touch operation satisfies a corresponding preset condition;
        determining whether the duration of the touch input performed on the icon of the message application is increased after displaying the at least one first target message;
        determining that a second touch operation is performed on the icon of the message application based on a determination that the duration of the touch input performed on the icon of the message application is increased; and
        switching to display at least one second target message.

6. The terminal of claim 5, wherein the at least one touch parameter of the first touch operation comprises a touch pressure value, and the corresponding preset condition comprises that the touch pressure value is greater than a preset pressure value.

7. The terminal of claim 5, wherein the at least one touch parameter of the first touch operation comprises a touch pressure value, and a fingerprint information, and the corresponding preset condition comprises that the touch pressure value is greater than a preset pressure value and the fingerprint information matches with a preset fingerprint information.

8. The terminal of claim 5, wherein the processor is further configured to invoke the computer-readable program codes to perform following operations:
   determining whether a third touch operation is performed on the icon of the message application when the duration of the touch input fails to be increased after displaying the at least one first target message;
   obtaining at least one touch parameter of the third touch operation in response to determining that the third touch operation is performed;
   determining a display mode according to the at least one touch parameter of the third touch operation and a correspondence between touch parameters and display modes; and
   displaying the at least one first target message in the determined display mode.

9. A terminal, comprising:
   a memory configured to store computer-executable program codes; and
   a processor configured to invoke the computer-executable program codes to perform following operations:
      displaying at least one first target message in response to detecting that an icon of a message application is touched;
      determining whether the icon of the message application is released upon displaying the at least one first target message;
      switching to display at least one second target message in response to determining that the icon of the message application is unreleased; and
      displaying the at least one first target message in a preset display mode in response to determining that the icon of the message application is released.

10. The terminal of claim 9, wherein the processor that is configured to invoke the computer-executable program codes to display the at least one first target message in the preset display mode is further configured to perform outputting at least one message previewing window to display the at least one first target message.

11. The terminal of claim 10, wherein the preset display mode comprises a scaling factor of each of the at least one message previewing window, and a scaling factor of content of each of the at least one first target message.

12. The terminal of claim 10, wherein the preset display mode comprises an arrangement manner of the at least one message previewing window.

13. The terminal of claim 10, wherein the preset display mode comprises an arrangement manner of the at least one first target message in the at least one message previewing window.

14. The method of claim 4, wherein displaying the at least one first target message in the determined display mode comprises:
   outputting at least one message previewing window to display the at least one first target message.

15. The method of claim 14, wherein the determined display mode comprises a scaling factor of each of the at least one message previewing window, and a scaling factor of content of each of the at least one first target message.

16. The method of claim 14, wherein the determined display mode comprises an arrangement manner of the at least one message previewing window.

17. The method of claim 14, wherein the determined display mode comprises an arrangement manner of the at least one first target message in the at least one message previewing window.

18. The terminal of claim 8, wherein the processor that is configured to invoke the computer-executable program codes to display the at least one first target message in the determined display mode is further configured to perform outputting at least one message previewing window to display the at least one first target message.

19. The terminal of claim 18, wherein the determined display mode comprises a scaling factor of each of the at least one message previewing window, and a scaling factor of content of each of the at least one first target message.

20. The terminal of claim 18, wherein the determined display mode comprises an arrangement manner of the at least one first target message in the at least one message previewing window.

* * * * *